(No Model.)

C. G. COLLINS.
PROCESS OF ELECTRODEPOSITING ALUMINIUM.

No. 577,186. Patented Feb. 16, 1897.

Witnesses:
D. W. Gardner.
G. T. Miatt

Inventor:
Caleb G. Collins
By his Attorney
George William Miatt

UNITED STATES PATENT OFFICE.

CALEB GROZIER COLLINS, OF WOODSBURG, NEW YORK, ASSIGNOR TO CALVIN AMORY STEVENS, OF NEW YORK, N. Y.

PROCESS OF ELECTRODEPOSITING ALUMINIUM.

SPECIFICATION forming part of Letters Patent No. 577,186, dated February 16, 1897.

Application filed May 18, 1896. Serial No. 591,891. (No specimens.)

*To all whom it may concern:*

Be it known that I, CALEB GROZIER COLLINS, a citizen of the United States, residing at Woodsburg, in the county of Queens and State of New York, have invented certain new and useful Improvements in Electrodeposition of Aluminium, of which the following is a specification sufficient to enable others skilled in the art to which the invention appertains to make and use the same.

My invention relates to the electrodeposition of aluminium, which I accomplish either from ores carrying alumina, from alumina salts, or from pure or impure aluminium.

The invention consists, primarily, in the use of a negative solution of potash and phosphate of aluminium on one side of a porous partition and a positive acid solution of an alumina salt on the other side of the partition, in connection with an electrical current through the action of which aluminium is liberated and deposited at the cathode, and, secondarily, in certain specific combinations of elements in solution, as hereinafter set forth.

Figure 1:
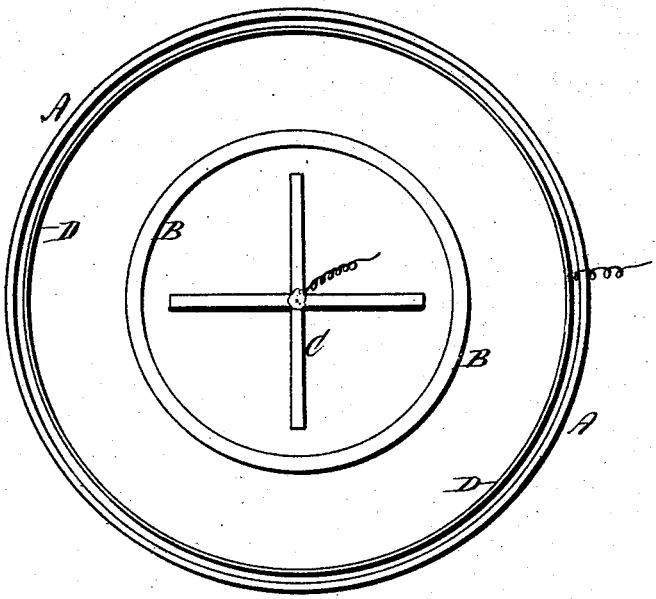
Figure 2:
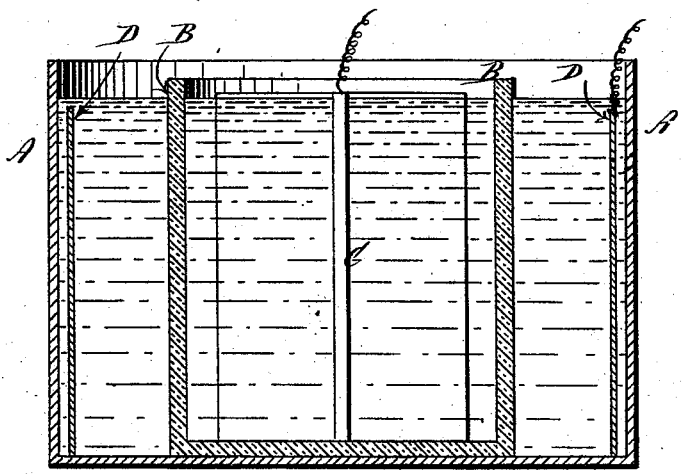

In the accompanying drawings, Figure 1 is a plan of parts by which my invention may be carried into effect; Fig. 2, a transverse section of the same.

A is a tank, in which is situated the porous cell B.

C is the anode of carbon or aluminium, as the case may be, and D a circular cathode of aluminium or any other metal upon which it is desired to make the electrodeposit.

In carrying out my invention a positive solution of a salt of alumina is one of the essential features, and this may be attained either directly from an ore containing alumina or from an anode of pure or impure aluminium.

Since impure aluminium can be produced at comparatively little expense, while the production of pure aluminium has heretofore been difficult and expensive, I am enabled by my process to produce absolutely pure aluminium from an impure anode with advantage and profit, the acid in the solution attacking the impure aluminium to form a salt of aluminium, or the latter can be obtained directly from an ore containing alumina, in which case the ore is crushed, preferably to a fine powder, before being introduced into the acid solution.

Any acid may be used to obtain a salt of alumina, although for ordinary purposes sulfuric acid is preferable, and I herein describe its use, although I do not limit myself thereto.

By way of illustration, supposing finely-powdered ore to be used, I treat it, say, with sulfuric acid diluted in water to 45° Baumé scale, which is found to work well in practice, resulting in a solution of sulfate of aluminium. This solution is placed in a porous cell which contains a carbon plate or other suitable conductor of electricity, the positive pole of my depositing-bath; or an anode of aluminium may be used in a solution of sulfuric acid with like results. Where the crushed ore is used, care should be taken to so proportion the sulfuric acid to the alumina present that all or nearly all the acid will be used up in the work of liberating the alumina, so as to avoid the presence of free acid in the porous cell.

The porous cell containing the solution of the salt of alumina is placed in a larger vessel containing a negative solution, the essential features of which are that it contains potash and phosphate of aluminium, although I prefer to accelerate action by the addition to such negative solution of tartaric acid or aqua-ammonia, one or both. For instance, I dissolve potash in water until it stands at 20° Baumé scale, more or less, not confining myself in this particular. In this solution of potash I dissolve tartaric acid or any other derivative of pure argol in, say, the proportion of two-tenths by weight of the potash used. When dissolution is complete, I add to the solution about two pounds of phosphate of aluminium to each gallon of the solution. When the phosphate is fully dissolved, I add aqua-ammonia of, say, 26° of strength in the proportion of three per cent. of the whole solution, care being taken not to use excess of ammonia. In this negative solution I place a thin plate or sheet of aluminium or any other article upon which it is desired to deposit pure aluminium, such plate or article being connected with the negative pole of any suitable source of electricity. The anode and cathode being electrically connected, molecules of aluminium are liberated in the positive solution, pass through the porous cell and negative solution to the cathode, and are deposited thereon. The tartaric acid or other derivative of argol may also be omitted, if desired, although its presence contributes materially in facilitating and quickening the electrodeposition of the aluminium.

It is to be understood that ores carrying alumina may be treated with acid directly in the porous cell, as well as an anode of pure or impure aluminium, or the solution of a salt of aluminium may simply be introduced into said cell, as hereinbefore indicated.

In place of the dry phosphate of aluminium, phosphoric acid and alumina may be added to form the phosphate of aluminium, and other variations may be made in attaining the requisite combinations and conditions in the solutions, as I do not confine myself strictly to the formula herein set forth, since variations may be made therein without materially changing the results or evading the spirit and intent of my invention, the distinguishing feature in which is the use of potash and phosphate of aluminium for the purpose designated.

What I claim as my invention, and desire to secure by Letters Patent, is—

1. The process herein set forth of effecting the electrodeposition of aluminium consisting in passing an electric current successively through a positive solution containing a salt of aluminium, a porous partition, and a negative solution containing potash and phosphate of aluminium, substantially in the manner and for the purpose described.

2. The process herein set forth of effecting the electrodeposition of aluminium, consisting in passing an electric current successively through a positive solution containing a salt of aluminium, a porous partition, and a negative solution containing potash, phosphate of aluminium and aqua-ammonia, substantially in the manner and for the purpose described.

3. The process herein set forth of effecting the electrodeposition of aluminium, consisting in passing an electric current successively through a positive solution containing a salt of aluminium, a porous partition, and a negative solution containing potash, phosphate of aluminium, aqua-ammonia, and a derivative of argol, substantially in the manner and for the purpose described.

4. The process herein set forth of effecting the electrodeposition of aluminium, consisting in passing an electric current successively through a positive solution containing sulfate of aluminium, a porous partition, and a negative solution containing potash and phosphate of aluminium, substantially in the manner and for the purpose described.

CALEB GROZIER COLLINS.

Witnesses:
GEORGE WILLIAM MIATT,
D. W. GARDNER.